United States Patent [19]

Crawford et al.

[11] 4,413,399

[45] Nov. 8, 1983

[54] APPARATUS AND METHOD FOR PRECISELY POSITIONING AN OBJECT

[75] Inventors: David J. Crawford, Poughkeepsie; Robert G. Meeker, LaGrangeville, both of N.Y.

[73] Assignee: International Business Machines Corporation, Armonk, N.Y.

[21] Appl. No.: 241,821

[22] Filed: Mar. 9, 1981

[51] Int. Cl.[3] ........................ B21D 39/03; B23P 19/04

[52] U.S. Cl. ........................................ 29/428; 29/267

[58] Field of Search ......................... 29/267, 428, 854; 269/188, 235, 254 CS; 254/120, 123; 74/107, 104; 329/17 LM, 45 M, 75 MP

[56] References Cited

U.S. PATENT DOCUMENTS

| | | | |
|---|---|---|---|
| 1,608,392 | 11/1926 | Hannah | 188/196 P |
| 3,064,768 | 11/1962 | Dotto | 188/152 |
| 3,676,832 | 7/1972 | Judge et al. | 339/75 M |
| 3,915,537 | 10/1975 | Harris et al. | 339/176 R |
| 3,920,302 | 11/1975 | Cutchaw | 339/75 MP |
| 4,047,782 | 9/1977 | Yeager | 339/75 MP |
| 4,059,323 | 11/1977 | Babuka et al. | 339/75 M |
| 4,084,874 | 4/1978 | Georgopulos | 339/75 MP |
| 4,159,861 | 7/1979 | Anhalt | 339/75 MP |
| 4,189,200 | 2/1980 | Yeager et al. | 339/75 MP |
| 4,233,646 | 11/1980 | Leung et al. | 361/399 |
| 4,260,210 | 4/1981 | Babuka et al. | 339/75 M |

FOREIGN PATENT DOCUMENTS

| | | |
|---|---|---|
| 836746 | 11/1954 | Fed. Rep. of Germany . |
| 1675155 | 1/1968 | Fed. Rep. of Germany . |
| 1373216 | 8/1964 | France . |
| 2058684 | 5/1971 | France . |

OTHER PUBLICATIONS

IBM Technical Disclosure Bulletin, vol. 10, No. 11, Apr. 1968, Gustafson, R. M., "Low-Stress Connector", p. 16.

IBM Technical Disclosure Bulletin, vol. 12, No. 8, Jan. 1970, Pittwood, D. G. & Zurowski, R. L., "Card-to--Board Pluggable Contact System", pp. 1210-1211.

IBM Technical Disclosure Bulletin, vol. 15, No. 8, Jan. 1973, Doody, G. E., "Low-Insertion Force Connector—Circuit Card Actuated", pp. 2534-2535.

IBM Technical Disclosure Bulletin, vol. 17, No. 1, Jun. 1974, Branson, C. A.; Marshall, C. H.; Russell, L. A., "Cam Actuated, Force-Free Connector with Contact Springs", pp. 138-139.

IBM Technical Disclosure Bulletin, vol. 18, No. 8, Jan. 1976, Agard, R. L.; Brearley, L. E.; Mankus, J. R., "Offset Contact Blade Carrier", p. 2460.

IBM Technical Disclosure Bulletin, vol. 16, No. 9, Feb. 1974, Harris, J. B., "Connector Actuator Device", pp. 2839-2840.

IBM Technical Disclosure Bulletin, vol. 21, No. 11, Apr. 1979, Babuka, R.; Bossi, E.; Schultz, L. K., "Linear Actuation Device", pp. 4441-4443.

IBM Technical Disclosure Bulletin, vol. 22, No. 9, Feb. 1980, Hampson, R. A.; Miller, E. D., "Constant Linear Feed Roll Paper Indexing Mechanism", pp. 4016-4017.

*Primary Examiner*—Francis S. Husar
*Assistant Examiner*—Steven E. Nichols
*Attorney, Agent, or Firm*—Pollock, Vande Sande & Priddy

[57] ABSTRACT

An apparatus and method are disclosed for precisely positioning an object such as a circuit module (12, 108) by moving it a fixed distance from an unknown initial position, for the purpose, for example, of moving connector pins a fixed distance into associated socket connector springs (136). A resilient spring (40, 42, 100) is compressed between a fixed stop (18, 20, 90) and a member (48, 106) which engages the object; so that the object is moved an unknown distance (A, B, C) to an initial position determined by its encountering resistance which exceeds the force applied by the spring, such as the resistance provided by connector springs when connector pins are inserted. The compression existing in the bias spring is maintained when the initial position is reached while concurrently the engaging member (48, 106) is moved a fixed distance from the initial position, such as the desired insertion distance of connector pins into connector springs. A wedge (64, 124) and lever (72-84, 124-134) linkage maintains the spring compression while moving the engaging member.

12 Claims, 7 Drawing Figures

APPARATUS AND METHOD FOR PRECISELY POSITIONING AN OBJECT

DESCRIPTION

Technical Field

The present invention concerns an apparatus and method for precisely positioning an object by moving it a fixed distance from an unknown initial position. The invention is particularly adapted for use in electronic systems comprising circuit modules which include numerous connector pins which mate with associated guide socket connectors, to facilitate proper insertion and removal of the modules. Other applications are also within the scope of the invention, as will be discussed hereinafter.

BACKGROUND ART

In various electrical and electronic systems, connector pins and guide socket connectors have been used to assemble circuit modules into a support frame or similar structure. As illustrated in FIG. 1 of the present specification, a module assembled using such prior art connectors typically requires varying degrees of force to achieve full insertion of its pins into the connector springs associated with the guide sockets. Initially, the module encounters no or very slight resistance as its pins pass into the empty sockets, as shown in Region A. However, as the connector pins initially spread the connector springs, a marked increase in insertion force is experienced, as shown in Region B. Once the connector springs have been deflected for most of the pins, the insertion force drops off somewhat, as shown in Region C. The pins reach the end of their travel in Region D. For example, in the connector shown in U.S. Pat. No. 3,915,537, the module encounters no resistance when the pins move into their guide sockets, small resistance when the pins are moved sideways into contact with the connector springs (Region A), increasing resistance as the connector springs are spread (Region B), and reduced resistance as the connection is completed (Region C). The disclosure of this patent is hereby incorporated by reference in the present specification.

Typically, it is desired to stop insertion when all of the pins are in Region C. However, due to unavoidable variations from pin to pin and from guide socket connector to guide socket connector, the force versus displacement curve for each circuit module and connector assembly will be somewhat different. Ideally, the pins should be moved a fixed distance from the start of Region B into the middle of Region C.

Various approaches have been followed to achieve the desired degree of pin insertion. In U.S. Pat. No. 3,784,954, the circuit module or printed circuit board is provided with bolt or stud elements accurately positioned relative to the connector pins. Engagement arms pivoted to the support frame include cam surfaces which bear on the studs upon rotation of the arms, thus inserting the pins into or removing them from the connectors. Other applications are known in which accurately positioned tabs on the module are contacted by actuator pins on an associated pivoted bail. Provision of such tabs or studs increases the cost of the module and may undesirably limit the space available on the module for circuit elements or connector pins. Accurately positioned notches in the module have also been proposed, but suffer from similar and other disadvantages.

Thus, a need has continued to exist for a mechanism for connecting and disconnecting circuit modules without requiring that the dimensions of the module be carefully controlled so that the connector pins of the module will properly engage with and disengage from the associated guide socket connectors.

SUMMARY OF THE INVENTION

An object of the invention is to provide an apparatus and method for moving an object, such as a circuit module, a fixed distance from an initial position, such as the position at which the module's connector pins just engage the resistance of the connector springs of an associated guide socket connector.

Another object of the invention is to provide such an apparatus and method which are essentially unaffected by normal variations in the dimensions of the object to be positioned and require no precisely positioned reference feature or reference point on the object to ensure accurate positioning.

A further object of the invention is to provide such an apparatus and method which are of general utility for a variety of applications such as in clutch or brake applying mechanisms to account for wear, in valve actuating mechanisms for internal combustion engines, in bottle capping and sealing equipment to account for different container heights, and in other applications where the distance from the object to a desired final position may vary from time to time.

These objects are given only by way of illustrative examples; thus, other desirable objectives and advantages inherently achieved by the disclosed invention may occur or become apparent to those skilled in the art. Nonetheless, the scope of the invention is to be limited only by the appended claims.

An apparatus configured according to the invention is useful for moving an object a fixed distance from an initial position and includes a support frame or member having a stop member affixed thereto. A first means is mounted for movement relative to the support member into engagement with the object to be moved, to impart force to it. A second means is mounted for movement relative to the support member and engages the stop member. Between these two means is compressed a resilient bias spring which tends to urge the first means into contact with the object of interest and to urge the second means against the stop. The object will move an unknown, variable distance in response to the force exerted by the spring until it encounters a resistance to movement which exceeds the force imparted by the spring, at which point the object assumes what is termed herein as its "initial" position. Such a resistance could be provided by the springs in each connector into which the connector pins of a circuit module have been inserted, as the pins first begin to deflect the springs. A third means operatively associated with the first and second means then fixes their positions relative to each other and moves them together through a fixed distance so that the object is moved a fixed distance from its initial, unknown position to a final position.

In the preferred embodiment of the invention, the third means comprises a cam element such as a wedge which is movable to contact one surface on the first means and another, angled surface on the second means. The point at which contact is established with these two surfaces is fixed and the clearances of the elements among themselves are so small, that the wedge jams or locks the first and second means together after the object has reached its initial position under the influence of the bias spring. A lever pivoted to the support element then moves the first and second means and the wedge through the desired fixed distance. Preferably, the lever includes a slot which slidably receives a pin extending from the wedge, so that the wedge can move linearly while the lever rotates.

The first means may comprise a simple pusher bar which engages one side or edge of the object, or in the case of a circuit module, may comprise a rigid frame which engages the module at opposite ends to facilitate both insertion and removal with the same mechanism.

In accordance with the method of the invention, an object is moved a fixed distance from an initial position by providing a stop member which is fixed relative to the object and a means for engaging the object to impart force thereto. A bias spring is maintained compressed between the engaging means and the stop so that the resultant spring force moves the object an unknown, variable distance to an initial position where it stops due to having encountered resistance exceeding the spring force. Then, while maintaining the compression existing in the spring when the initial position is reached, the engaging means and the object are moved through a fixed distance.

BRIEF DESCRIPTION OF THE DRAWINGS

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Figure 1:
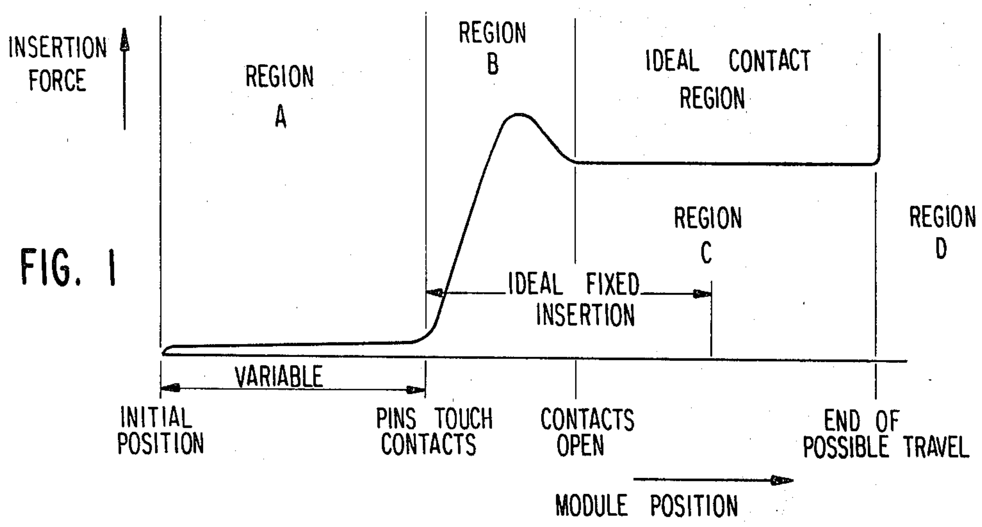
FIG. 1 shows a plot of a typical insertion force versus module position for a multipin-multisocket connector of the type previously discussed.

The following is a detailed description of the preferred embodiments of the invention, reference being made to the drawings in which the same reference numerals identify the same elements of structure in each of the several Figures.

Figure 2A:
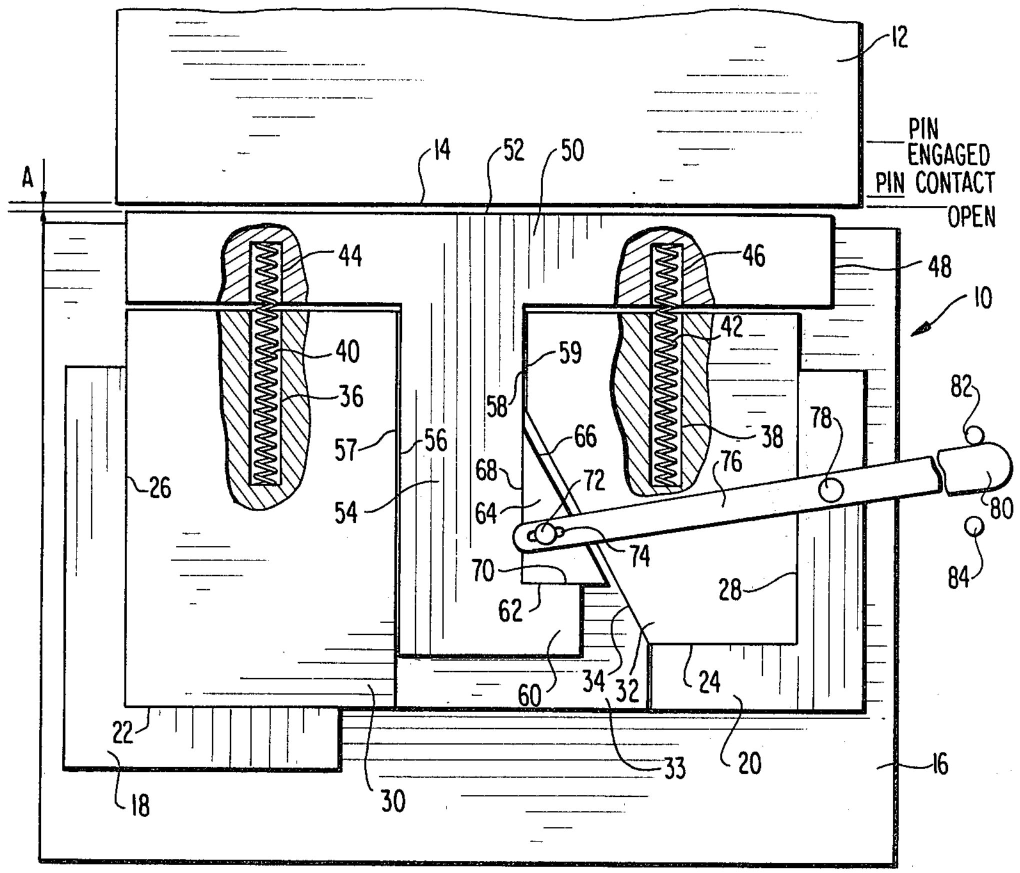
FIGS. 2A–2C show plan views of successive operating positions of a prototype apparatus according to the invention particularly suited for demonstrating the basic features of the invention which facilitate uniformly engaging the connectors of circuit modules of varying exterior dimensions.
Figure 3:
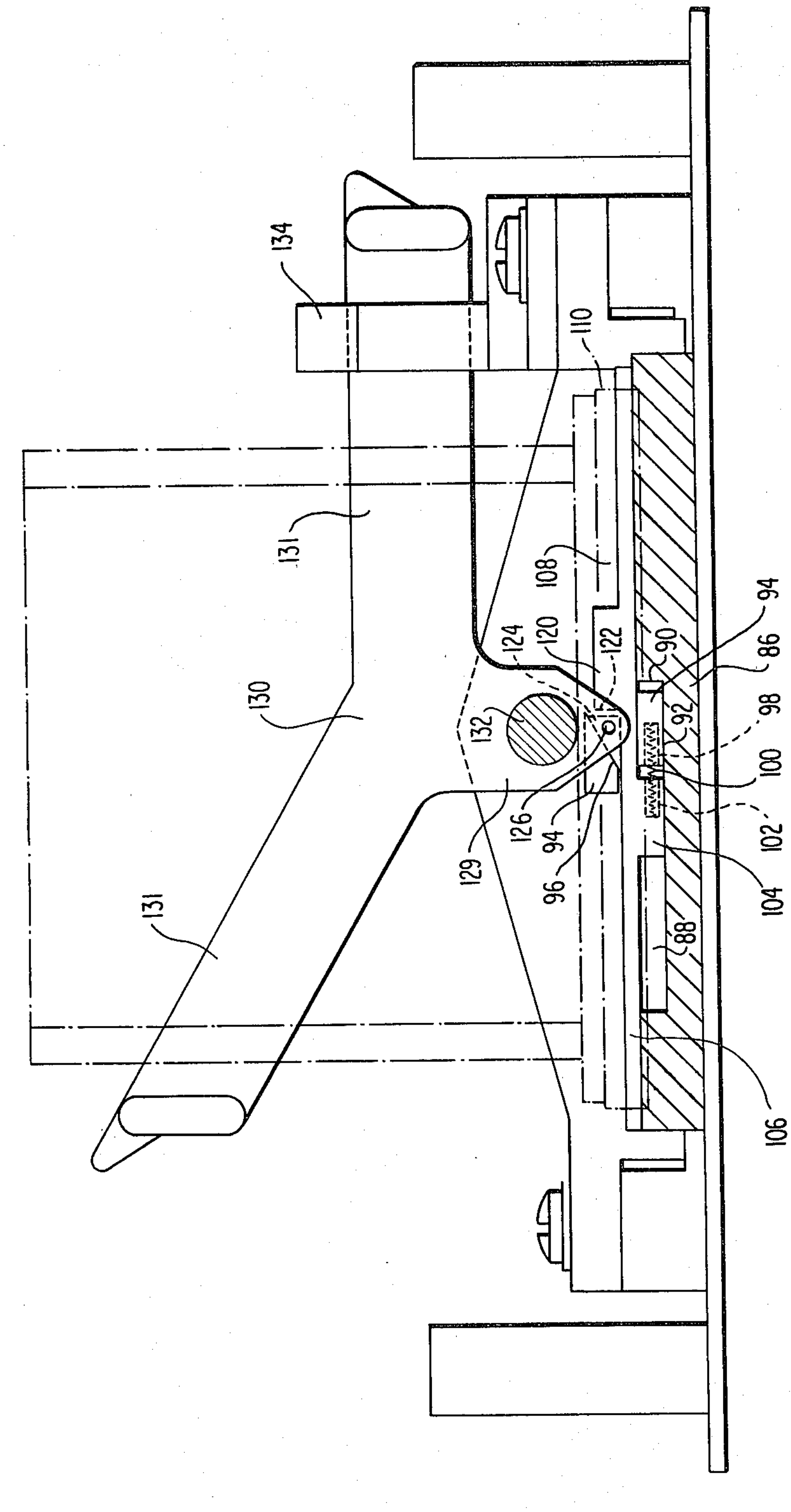
FIG. 3 shows a side view of a preferred embodiment of the invention which functions identically to the prototype shown in FIG. 2 but is configured to engage and disengage the downwardly extending connector pins of one type of rectangular circuit module with and from their associated guide socket connectors.
Figure 5:
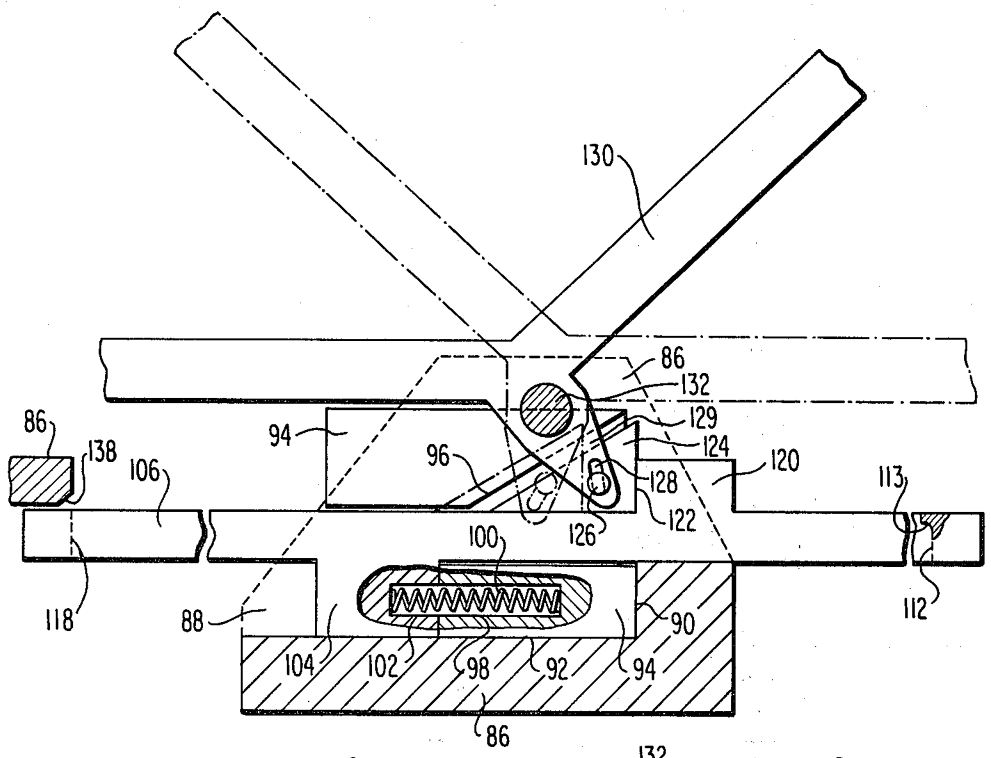
FIG. 5 shows an enlarged view, partially in section, taken along line 5—5 of FIG. 4.
Figure 4:
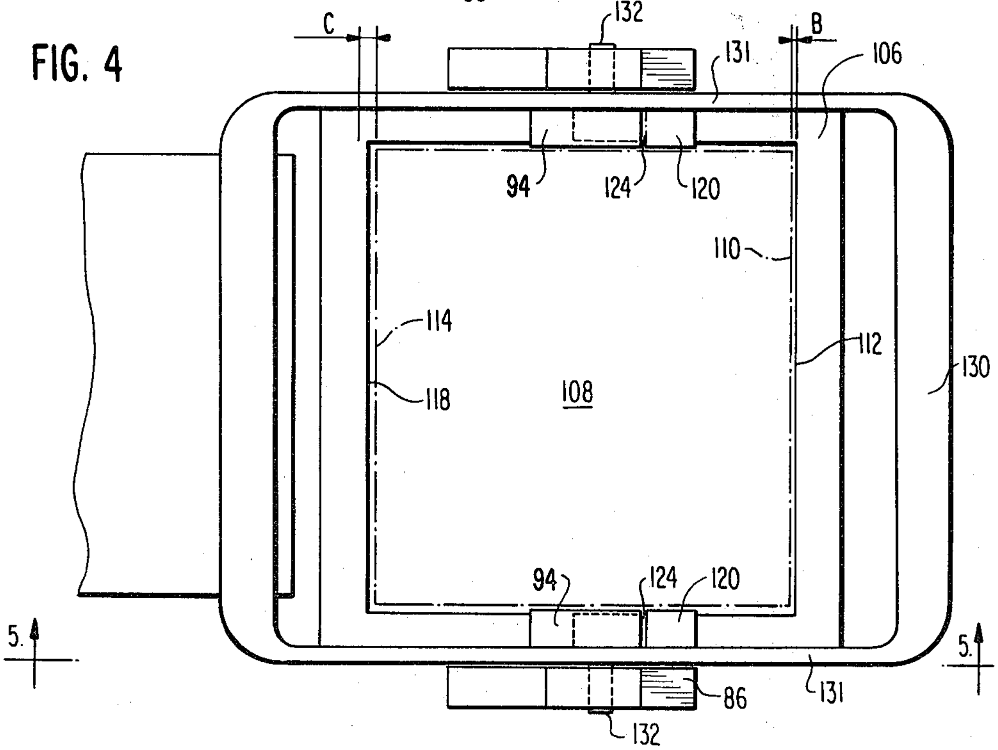
FIG. 4 shows a simplified plan view of an apparatus of the type shown in FIG. 3.

FIG. 2A shows a prototype apparatus 10 according to the invention which is arranged to engage the multiple connector pins of an object such as an electric circuit module 12, shown only fragmentarily, with an associated multiple guide socket connector assembly, not illustrated. Module 12 is shown to have a straight rear edge 14 against which force is to be applied by apparatus 10; however, other edge configurations may also be used. Apparatus 10 comprises a rigid, flat base or support member 16 of metal or other suitable material. A pair of right angle stop members 18, 20 are fixed to base 16 and include horizontal stop surfaces 22, 24 and vertical guide surfaces 26, 28. Surfaces 22, 24 may be staggered, as illustrated, or aligned, as desired. A rigid backing plate 30, 32, preferably formed from a single plate, is slidably positioned on base 16 against stop members 18, 20 in the illustrated, disengaged position. Plate 30, 32 includes a central, axially extending recess 33 in its upper surface. Recess 33 includes an angled side wall or edge 34, for a purpose to be discussed. At its upper edge, as illustrated, plate 30, 32 comprises axially extending spring pockets 36, 38 which retain the lower ends of resilient bias springs 40, 42. The upper ends of these springs are captured in aligned spring pockets 44, 46 provided in a stiff pusher member 48 slidably mounted in recess 33. Member 48 has a generally T-shaped configuration with an upper cross member 50 having a straight upper edge 52 for engaging circuit module 12. Member 50 also may be in the form of an open frame surrounding module 12, as shown in the embodiment of FIGS. 3–5. In such a case, the apparatus may be used to disengage the module by rotating lever 76 counter-clockwise until wedge 64 engages edge 62 to pull on pusher member 48 and disengage the module. An integral leg 54 extends downwardly from member 50 and includes parallel side edges 56, 58 which are fitted with close tolerances to the adjacent walls or edges 57, 59 of recess 33. At its lower end, leg 54 includes a laterally extending arm member 60 having an upper edge 62 extending preferably at a right angle to edge 58.

As illustrated, edges or surfaces 34, 58 and 62 define a roughly triangular area within recess 33, within which area a cam element such as a wedge 64 is slidably positioned. Wedge 64 comprises an angled edge 66 oriented to engage edge 34, a vertical edge 68 oriented to engage edge 58 and a horizontal edge 70 oriented to engage edge 62. A pivot pin 72 extends from wedge 64 and is slidably received in a slot 74 located at one end of an actuator lever 76. A pivot 78 secures lever 76 to stop 20 or any other point fixed relative to base 16. The outer end 80 of lever 76 extends between a stop 82 which contacts lever 76 when apparatus 10 is fully disengaged from circuit module 12; and a stop 84 which contacts the lever when module 12 is fully engaged with its guide socket connector. If desired, locking detents may be provided at stops 82, 84.

Figure 2B:
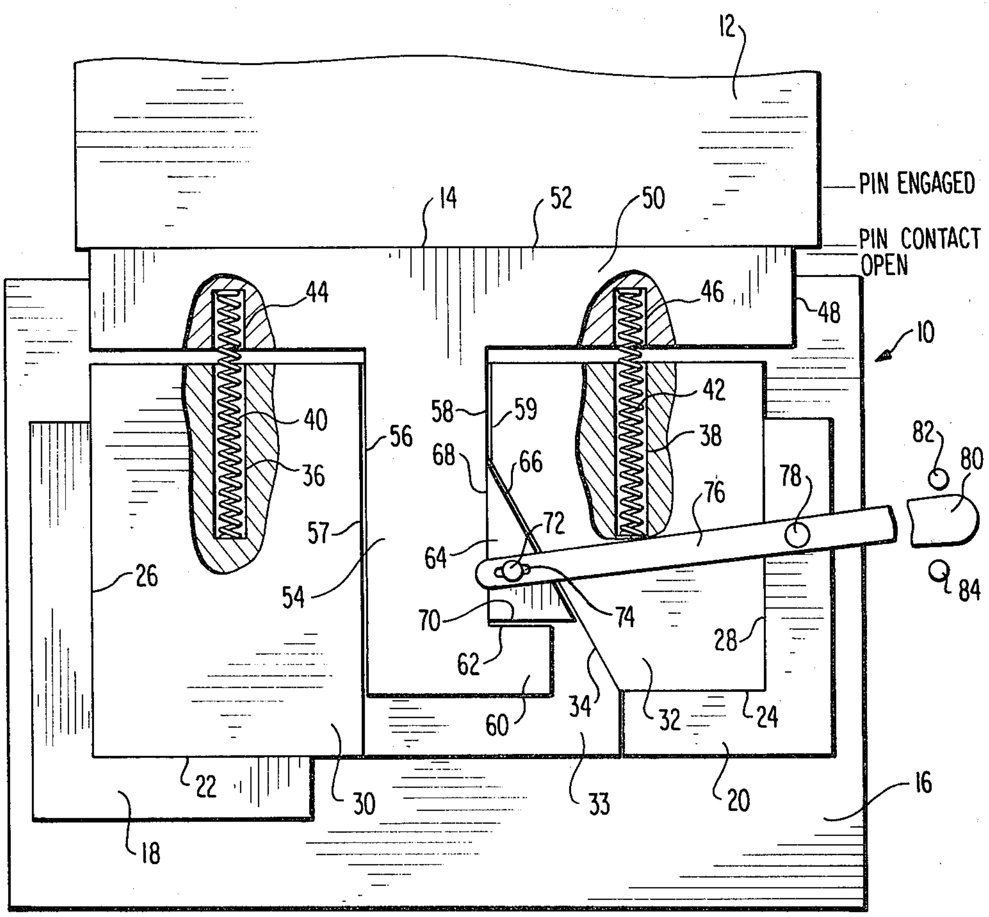

In operation, prior to placement of a circuit module 12 adjacent edge 52, lever 76 is rotated into contact with stop 82, as shown in FIG. 2A, which moves wedge 64 to the illustrated position, thereby pulling pusher member 48 downward, as illustrated, compressing springs 40, 42 and fully engaging backing plate 30, 32 with stops 18, 20. Stop 82 may be omitted if cross member 50 can be moved into contact with backing plate 30, 32 to fully compress springs 40, 42. Module 12 is then dropped in place adjacent edge 52 with its connector pins in their underlying guide sockets but not yet contacting the connector springs. At this time, an unknown clearance "A" typically will exist between edges 15 and 52. To engage the pins of module 12 with their connector springs, lever 76 is rotated toward stop 84, thus causing wedge 64 to move upwardly. Pusher member 48 will follow until edge 52 moves into contact with edge 14 under the influence of springs 40, 42, thus closing unknown clearance "A". Module 12 then will continue to move under the influence of springs 40, 42 until its pins contact the connector springs or contacts of the guide sockets, at the beginning of Region B as shown in FIG. 1 and in FIG. 2B. Springs 40, 42 are selected so that their imparted force is sufficient to move pusher member 48 and module 12 through Region A in FIG. 1, but insufficient to overcome the resistance of the connector springs. Thus, pusher member 48 and module 12 stop at the end of Region A having travelled an unknown distance to this initial position. Backing plate 30, 32 remains against stops 18, 20, as shown in FIG. 2B.

Figure 2C:
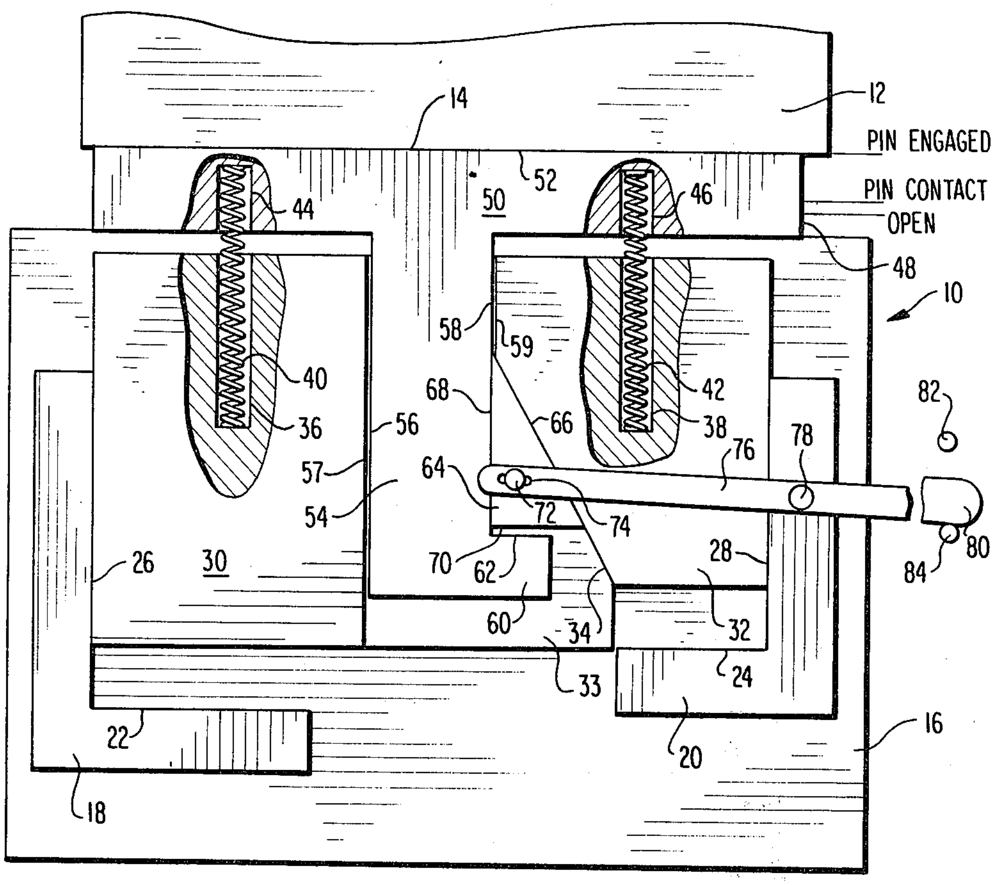

Continued rotation of lever 76 eventually moves wedge 64 into contact with surfaces 34 and 58, as shown in FIG. 2C. Due to the presence of stops 18, 20 and the close tolerances among the edges of stops 18, 20, edges 57, 59 and member 48 and plate 30, 32 into a single unit which moves as one upon further rotation of lever 76. The point at which this locking occurs will be the same during each cycle of operation, due to the geometry of wedge 64 and edges 34, 56–59. Thus, with module 12 positioned at the beginning of Region B, wedge 64 locks member 48 and plate 30, 32, thereby maintaining the existing degree of compression of springs 40, 42. Lever 76 is then rotated the remaining, fixed distance to stop 84, so that module 12 is moved a fixed distance from its unknown initial position to a final position in which its connector pins engage with their associated connector springs.

FIGS. 3 to 5 show another embodiment of the invention which also includes provision for disengaging the module from its guide socket connectors. A rigid base or support member 86 is provided with an elongated horizontal notch 88 having an upwardly extending stop surface 90 at one end thereof and a flat, horizontal bottom surface 92. An upright backing block 94 is cut away on one side to form a cavity bounded on its upper edge by an angled surface 96. The lower end of block 94 is provided with a spring pocket 98 which retains one end of a resilient bias spring 100. The other end of the spring is retained by a spring pocket 102 provided in a downwardly extending abutment 104 which is formed integrally with one side wall of a rigid frame 106 which, as seen in FIG. 4, surrounds the circuit module 108, shown in phantom. A fully-encircling frame is preferred; however, a partial frame may also be used. The rear edge 110 of module 108 is adjacent rear edge 112 of frame 106; whereas, the front edge of module 108 is adjacent front edge 118 of frame 106. The connector pins of module 108 extend downwardly into the plane of the figure (not illustrated) but could also extend laterally from the module without requiring a departure from the scope of the present invention. An upwardly extending abutment 120 on frame 106 includes a forward wall 122 which faces the cavity in backing block 94 bounded by angled surface 96. Within this cavity is located a cam element or wedge 124 from which a pivot pin 126 extends into a slot 128 provided in a projection 129 of an actuator bail 130, the bail having spaced side legs 131 extending to either side of frame 106. A shaft 132 supports bail 130 for rotation between a fully engaged position defined by a retaining latch or stop 134 and a fully disengaged position.

Operation of the apparatus shown in FIGS. 3 to 5 is substantially identical to that of the embodiment of FIG. 2. Bail 130 is rotated counterclockwise to force wedge 124 against surface 122, thereby moving backing block 94 against surface 90 and compressing spring 100. Module 108 is then placed within frame 106 with its connector pins extending downwardly into their corresponding guide sockets in the underlying socket assembly (not illustrated). When bail 130 is rotated clockwise. spring 100 first moves edge 112 through unknown clearance "B" into contact with edge 110 and then pushes frame 106 and module 108 through an unknown distance "C" in Region A of FIG. 1. At this point the frame and module stop in an unknown initial position when the pins have moved laterally into contact with their connector springs. To prevent upward movement of the module during engagement of its connector pins with the connector springs, a camming surface or lip 113 may be provided along the upper portion of edge 112. Wedge 124 thereafter locks itself between surface 96 and the flat upper surface of frame 106, the locking repeatedly occurring at the same place in the movement of the wedge regardless of the size of the module used. Continued rotation of bail 130 through the fixed distance to latch 134 causes wedge 124, backing block 94, frame 106 and module 108 to move together so that the downwardly extending connector pins advance a fixed lateral distance within assembly 136, thereby engaging their connector springs. Also to prevent upward movement of the module during engagement, base 86 may be provided with a projecting camming surface or lip 138 which extends over the leading edge of the module to hold it down during engagement. See FIG. 5. To disengage module 108, bail 130 is rotated counterclockwise to bring edge 118 into contact with edge 114, so that the connector pins are withdrawn from their connector springs into their associated guide sockets. As indicated in FIG. 4, frame 106 cooperates with identical backing blocks and wedges on opposite sides of the frame.

While our invention has been shown and described with reference to particular embodiments thereof, those skilled in the art will understand that various other variations in the form and detail of the apparatus and method may be made without departing from the spirit and scope of our invention. For example, the invention may be applied to both rectilinearly acting and rotating mechanisms. Thus, the various shapes described herein may be incorporated into cylindrical-type structures having corresponding radial cross-sections.

Having thus described our invention in sufficient detail to enable those skilled in the art to make and use it, we claim as new and desire to secure Letters Patent for:

1. Apparatus for moving an object a fixed distance from an unknown initial position, and apparatus comprising:

a support member;

a stop member fixed relative to said support member;

first means mounted for movement relative to said support member for engaging the object to be moved to impart force thereto;

at least one resilient bias spring;

second means mounted for movement relative to said support member for engaging said stop member and for maintaining said bias spring compressed between said first means and said second means, whereby force is imparted to said first means to cause it to engage and move said object an unknown distance to an initial position, said initial position being determined by resistance to movement of the object which exceeds the force imparted by said bias spring; and third means operatively associated with said first and second means for fixing the relative positions of said first and second means when said initial position is reached and then moving them together relative to said stop member through a fixed distance, whereby the object is moved said fixed distance from said initial position to a final position.

2. Apparatus according to claim 1, wherein said third means comprises:

a first surface on said first means;

a second surface on said second means, said second surface being spaced from and at an angle to said first surface;

a cam element positioned between said first and second surfaces;

fourth means fixed relative to said support member for moving said cam element into contact with said first and second surfaces to fix the relative positions of said first and second means.

3. Apparatus according to claim 2, wherein said cam element comprises a wedge having angled surfaces which contact said first and second surfaces upon movement of said wedge by said fourth means.

4. Apparatus according to claim 2, wherein said fourth means comprises a lever pivoted to said support member, said cam element being operatively connected to said lever, and a further stop member fixed relative to said support member for limiting rotation of said lever to prevent moving the object beyond said fixed distance from said initial position.

5. Apparatus according to claim 4, wherein said lever comprises a slot and said cam element comprises a pin extending into said slot, whereby said pin can move along said slot as said lever is rotated.

6. Apparatus according to claim 1, wherein said first means is adapted to engage the object for movement not only away from said initial position through said fixed distance to said final position, but also away from said final position through said fixed distance to said initial position; and said third means also is adapted to impart force to said first means to move the object away from said final position to said initial position.

7. Apparatus according to claim 6, wherein said third means comprises:

a first surface on said first means;

a second surface on said second means, said second surface being spaced from and at an angle to said first surface;

a third surface on said first means oriented at an angle to said first surface;

a cam element positioned among said first, second and third surfaces;

fourth means fixed relative to said support member for moving said cam element into contact with said first and second surfaces to fix the relative positions of said first and second means, or into contact with said third surface to impart force to said first means to move the object away from said final position to said initial position.

8. Apparatus according to claim 7, wherein the object is an electrical circuit module having connector elements for insertion into spring biased connector sockets and said first means comprises a rigid frame which at least partially surrounds the perimeter of said circuit module.

9. Apparatus according to claim 2, wherein said stop member limits movement of said second means transverse to the direction of movement of said cam element.

10. Apparatus according to claim 8, wherein said rigid frame comprises spaced side rails each having a downwardly extending abutment which slidably engages said support member and against which said bias spring pushes, said frame further comprising an upwardly extending abutment which comprises said third surface, said first surface also being on the upper side of said frame; said cam element comprises a pair of wedges which engage either said first and second or said first and third surfaces upon movement of said wedges by said fourth means; said fourth means comprising a lever pivoted to said support member adjacent said rigid frame, said wedges being operatively connected to said lever; and a further stop member fixed relative to said support member for limiting rotation of said lever to prevent moving the circuit module beyond said fixed distance from said initial position.

11. Apparatus according to claim 10, wherein said lever comprises a U-shaped bail pivoted to said support element, the legs of said bail each having a projection with a slot; each of said wedges comprising a pin extending into one of said slots in said projections, whereby said pins move along said slots as said bail is rotated to move said wedges.

12. A method for moving an object a fixed distance from an unknown initial position, said method comprising the steps of:

providing a stop member fixed relative to the object;

providing a first means for engaging the object to impart force thereto;

providing at least one resilient bias spring;

maintaining said bias spring compressed between said first means and said fixed stop, whereby force is imparted to said first means to cause it to engage and move said object an unknown distance to an initial position, said initial position being determined by resistance to movement of the object which exceeds the force imparted by said bias spring;

maintaining the compression existing in said bias spring when said initial position is reached; and concurrently with said maintaining, moving said first means through a fixed distance, whereby the object is moved said fixed distance from said initial position.

* * * * *

UNITED STATES PATENT AND TRADEMARK OFFICE

CERTIFICATE OF CORRECTION

PATENT NO. : 4,413,399

DATED : November 8, 1983

INVENTOR(S) : David J. Crawford and Robert G. Meeker

It is certified that error appears in the above-identified patent and that said Letters Patent is hereby corrected as shown below:

Column 5, line 15, after "and" insert -- edges 56, 58, wedge 64 effectively jams or locks itself, --;

Column 5, line 41, delete "wall" and insert -- rail --;

Column 6, line 48, delete "and" and insert -- said --.

Signed and Sealed this

*Twenty-first* Day of *February 1984*

[SEAL]

*Attest:*

GERALD J. MOSSINGHOFF

*Attesting Officer* *Commissioner of Patents and Trademarks*